(12) United States Patent
Hwang (10) Patent No.: US 7,996,667 B2
(45) Date of Patent: Aug. 9, 2011

(54) SYSTEM WITH AT LEAST TWO BIOS MEMORIES FOR STARTING THE SYSTEM

(75) Inventor: Yi-Bin Hwang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 726 days.

(21) Appl. No.: 12/110,291

(22) Filed: Apr. 26, 2008

(65) Prior Publication Data

US 2009/0187754 A1 Jul. 23, 2009

(30) Foreign Application Priority Data

Jan. 18, 2008 (CN) .......................... 2008 1 0300144

(51) Int. Cl.
*G06F 9/00* (2006.01)
(52) U.S. Cl. ................................. 713/2; 713/1
(58) Field of Classification Search .................. 713/2, 1, 713/300
See application file for complete search history.

(56) References Cited

U.S. PATENT DOCUMENTS

| | | | |
|---|---|---|---|
| 7,318,173 B1 * | 1/2008 | Falik et al. ....................... | 714/36 |
| 7,818,554 B2 * | 10/2010 | Wang et al. ....................... | 713/1 |
| 2002/0099974 A1 * | 7/2002 | Lin ................................. | 714/13 |
| 2003/0005277 A1 * | 1/2003 | Harding et al. .................... | 713/2 |
| 2003/0076311 A1 * | 4/2003 | Lin et al. ......................... | 345/204 |
| 2003/0097555 A1 * | 5/2003 | Cheston et al. .................... | 713/2 |
| 2005/0273588 A1 * | 12/2005 | Ong et al. ........................ | 713/2 |
| 2006/0026416 A1 * | 2/2006 | Chen .............................. | 713/2 |
| 2007/0033390 A1 * | 2/2007 | Chang et al. ...................... | 713/2 |
| 2008/0010446 A1 * | 1/2008 | Kim ............................... | 713/2 |
| 2009/0158024 A1 * | 6/2009 | Hung et al. ....................... | 713/2 |
| 2009/0158025 A1 * | 6/2009 | Hung et al. ....................... | 713/2 |

* cited by examiner

*Primary Examiner* — Chun Cao
(74) *Attorney, Agent, or Firm* — Frank R. Niranjan (57) ABSTRACT

A system with at least two basic input-output system (BIOS) memories includes a chip unit, a control unit, and two or more BIOS memories. The chip unit includes a control pin. The control unit includes an enable pin and N output pins. The enable pin of the control unit is connected to the control pin of the chip unit. Each of the N BIOS memories is connected to one of the N output pins of the control unit correspondingly. The chip unit is configured to start the control unit. The control unit is configured to start the N BIOS memories according to voltages of the output pins of the control unit. N is an integer greater than one.

5 Claims, 7 Drawing Sheets

SYSTEM WITH AT LEAST TWO BIOS MEMORIES FOR STARTING THE SYSTEM

BACKGROUND OF THE INVENTION

1. Field of the Invention

The present invention relates to a system with at least two Basic Input-Output System (BIOS) memories.

2. Description of Related Art

BIOS refers to the firmware code run by a personal computer when first powered on. The function of the BIOS is to identify and initiate component hardware (such as hard disk, floppy and optical disk drives). This is to prepare the machine so other software programs stored on various media can load, execute, and assume control of the PC. This process is known as booting, or booting up, which is short for bootstrapping.

A motherboard can be destroyed through improper flashing of the BIOS or through manual modifications of the flash file. In such a situation, either the BIOS cannot be loaded without errors, or invalid settings are assigned to the components. For this reason, users must write the BIOS program to the BIOS memory. However the times of write in the BIOS memory are limited.

SUMMARY

An exemplary system with at least two basic input-output system (BIOS) memories includes a chip unit, a control unit, and two or more BIOS memories. The chip unit includes a control pin. The control unit includes an enable pin and at least two output pins. The enable pin of the control unit is connected to the control pin of the chip unit. Each of the BIOS memories is connected to one of the output pins of the control unit correspondingly. The chip unit is configured to start the control unit. The control unit is configured to start the BIOS memories according to voltages of the output pins of the control unit.

Other advantages and novel features will become more apparent from the following detailed description when taken in conjunction with the accompanying drawings, in which:

DETAILED DESCRIPTION

Figure 1:
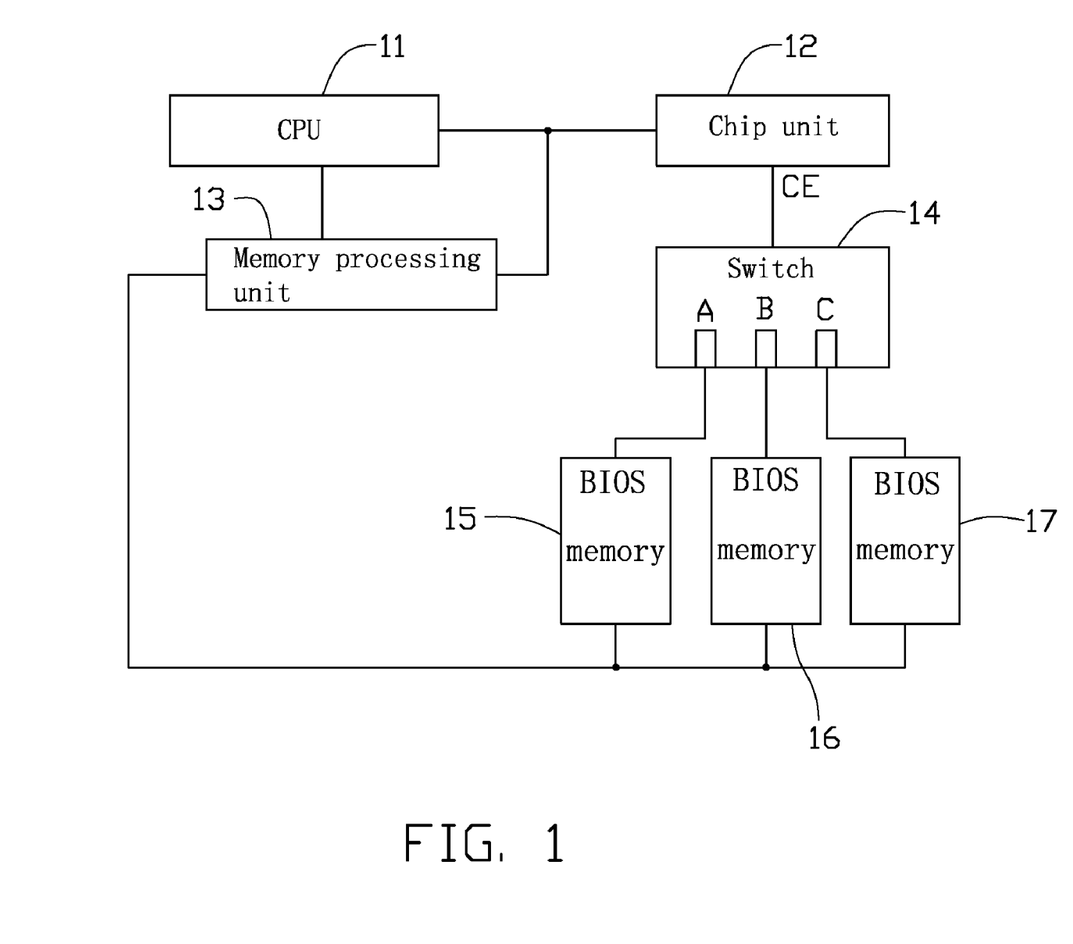
FIG. 1 is a block diagram of the first embodiment of a system with at least two BIOS memories in accordance with the present invention.

Referring to FIG. 1, a system with at least two BIOS memories in accordance with the first embodiment of the present invention includes a central processing unit (CPU) 11, a chip unit 12, a memory processing unit 13, a control unit such as a switch 14 and three BIOS memories 15, 16, and 17. This embodiment, and the following embodiments, include three BIOS memories for example. The chip unit 12 includes an enable pin CE. The switch 14 includes three throws A, B, C, called the switch throws, an enable pin, called the switch enable pin, and three output pins, called the switch output pins. The enable pin CE of the chip unit 12 is connected to the switch enable pin. The three switch output pins are respectively connected to the three BIOS memories 15, 16, and 17. When the switch 14 turns to the switch throw A, the switch output pin, which is connected to the switch throw A, outputs a high level voltage. As a result, the enable pin CE of the chip unit 12 is connected to the BIOS memory 15 to start the BIOS memory 15.

When the switch 14 turns to the switch throw B, the switch output pin, which is connected to the switch throw B, outputs a high level voltage. As a result, the enable pin CE of the chip unit 12 is connected to the BIOS memory 16, which is associated with the switch throw B, to start the BIOS memory 16. The programs in the BIOS memories 15-17 can be the same or not. Users can boot a computer system with anyone of the BIOS memories through the switch 14.

Figure 2:
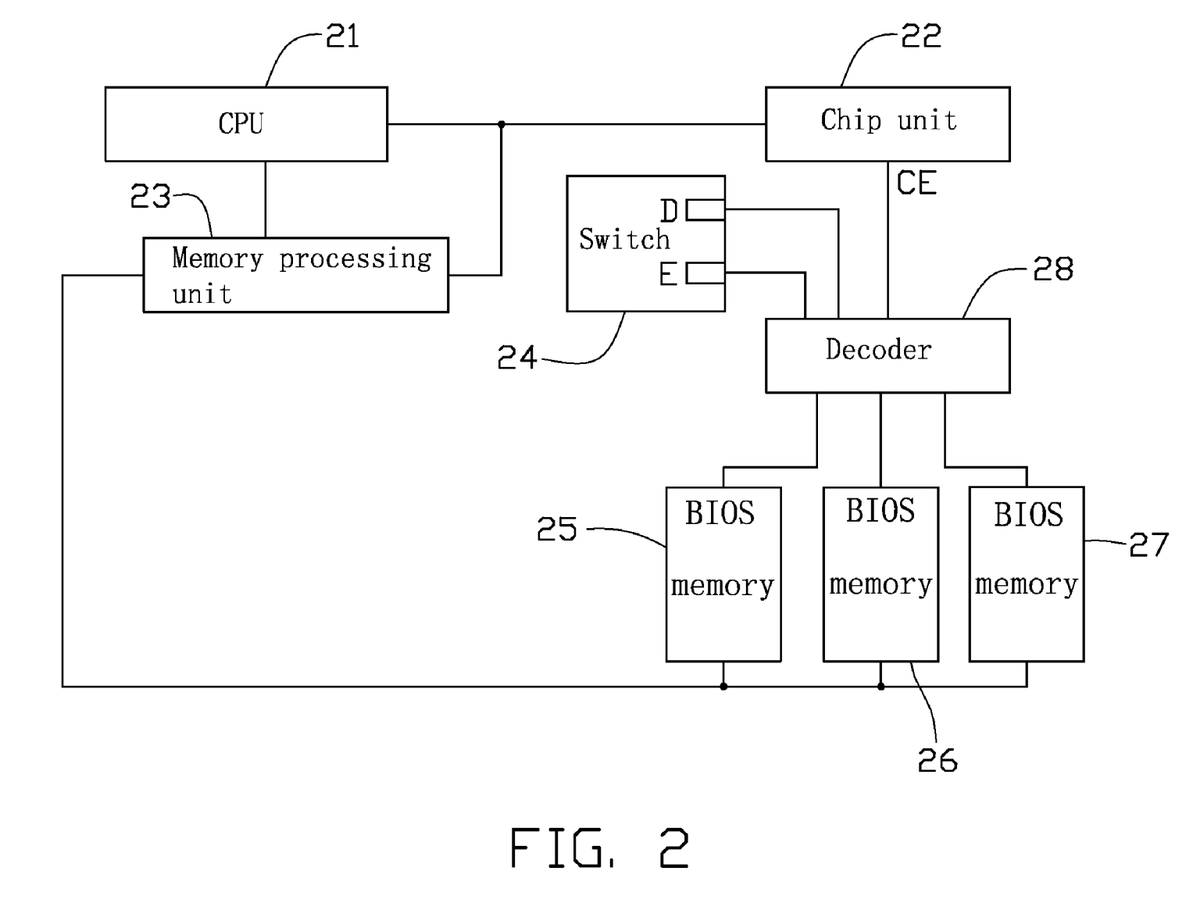
FIG. 2 is a block diagram of the second embodiment of a system with at least two BIOS memories in accordance with the present invention.

Referring to FIG. 2, a system with at least two BIOS memories in accordance with the second embodiment of the present invention includes a CPU 21, a chip unit 22, a memory processing unit 23, a control unit, three BIOS memories 25, 26, and 27. The CPU 21, the chip unit 22, the memory processing unit 23, the three BIOS memories 25, 26, and 27 are similar to the elements of the first embodiment. The control unit includes a switch 24 and a decoder 28. The switch 24 includes two switch throws D, E, and two switch output pins. The decoder 28 includes three decoder output pins, two decoder input pins, a decoder enable pin, and a decode rule. The three decoder output pins are respectively connected to the three BIOS memories 25, 26, and 27. The two decoder input pins are respectively connected to the two switch output pins. The decoder enable pin is connected to a control pin CE of the chip unit 22. The decoder 28 checks the status of the switch 24 according to the decode rule. For example, when one of the two switch output pins which is connected to the switch throw D outputs a low level voltage, and the other one which is connected to the switch throw E outputs a high level voltage, the decoder 28 starts to the BIOS memory 25. When one of the two switch output pins which is connected to the switch throw D outputs a high level voltage, and the other one which is connected to the switch throw E outputs a low level voltage, the decoder 28 starts the BIOS memory 26. In this embodiment, users can boot a computer system with anyone of the BIOS memories through the switch 24.

Figure 3:
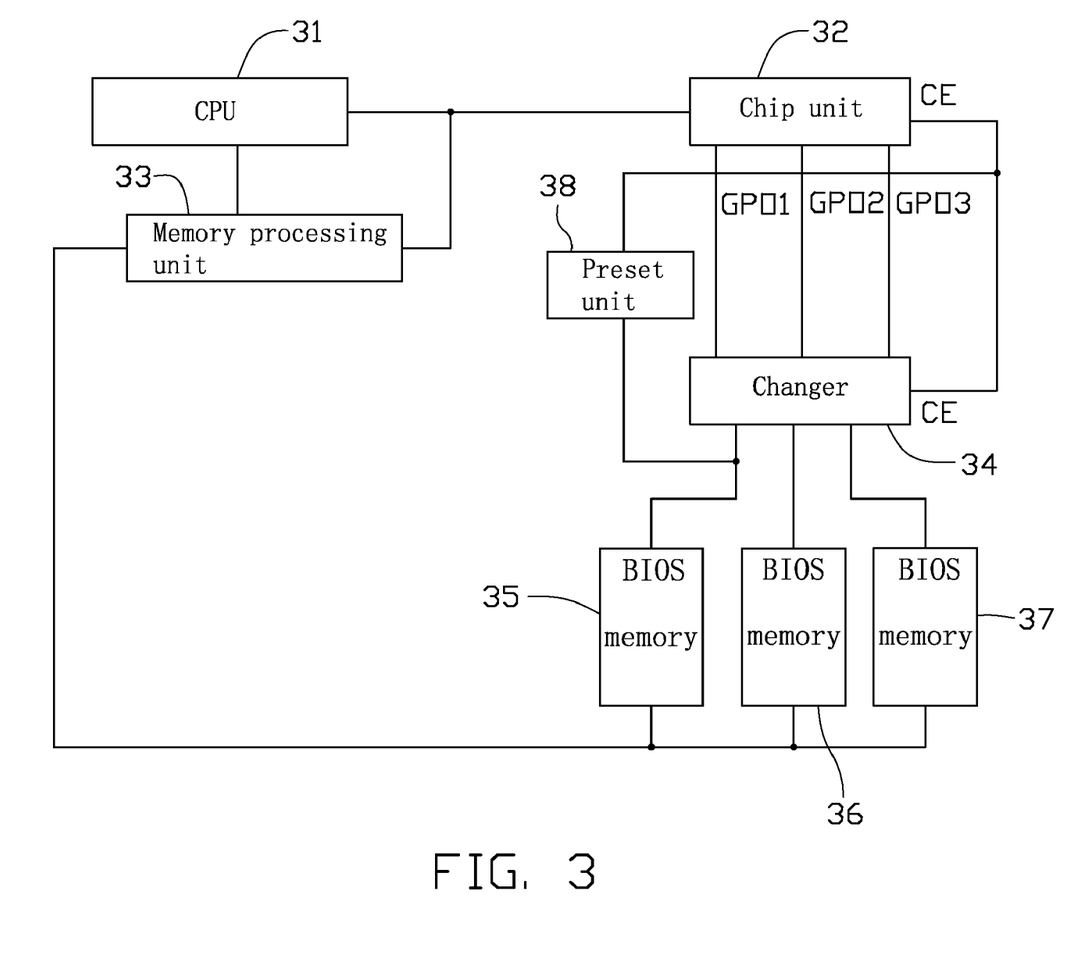
FIG. 3 is a block diagram of the third embodiment of a system with at least two BIOS memories in accordance with the present invention.

Referring to FIG. 3, a system with at least two BIOS memories in accordance with the third embodiment of the present invention includes a CPU 31, a chip unit 32, a memory processing unit 33, a control unit such as a changer 34, three BIOS memories 35, 36, 37, and a preset unit 38. The CPU 31 and the memory processing unit 33 are similar to the elements of the first embodiment. The chip unit 32 includes three chip output pins GPO1, GPO2, GPO3, and a control pin CE. The changer 34 includes a changer enable pin CE, three changer input pins, and three changer output pins. Each of the three BIOS memories 35, 36, and 37 is loaded with a set-up program. The preset unit 38 includes a preset unit input pin and a preset unit output pin.

The chip three output pins GPO1, GPO2, and GPO3 are respectively connected to the three changer input pins. The control pin CE of the chip unit 32 is connected to the changer enable pin CE and the preset unit input pin. The preset unit output pin is connected to the BIOS memory 35. The three changer output pins are respectively connected to the three BIOS memories 35, 36, and 37. Alternatively, the preset unit output pin can be connected to the BIOS memory 36 or 37. When the preset unit output pin is connected to the BIOS memory 36 or 37, the computer system is booted with the BIOS memory 36 or 37 correspondingly. The set-up program of each of the three BIOS memories 35, 36, and 37 is configured to set up the status of the three output pins GPO1, GPO2, and GPO3, therefore, users can boot a computer system with a selected one of the three BIOS memories 35, 36, and 37 when the computer system is booted at the next time.

When the computer system is booted at the first time, the three chip output pins GPO1, GPO2, and GPO3 all output low level voltages. As a result, the computer system boots with the BIOS memory 35 through the preset unit 38. In the BIOS memory 35, users can select anyone of the three BIOS memories 35, 36, and 37 to boot the computer system at next time. For example, users make the chip output pin GPO2 output a high level voltage, and the chip output pin GPO1 output a low level voltage via a set-up interface of the set-up program of the BIOS memory 35. Then the computer system will be booted with the BIOS memory 36 at the next time. Alternatively, users can set the status of the chip output pins GPO1, GPO2, and GPO3 via the set-up interface.

Figure 4:
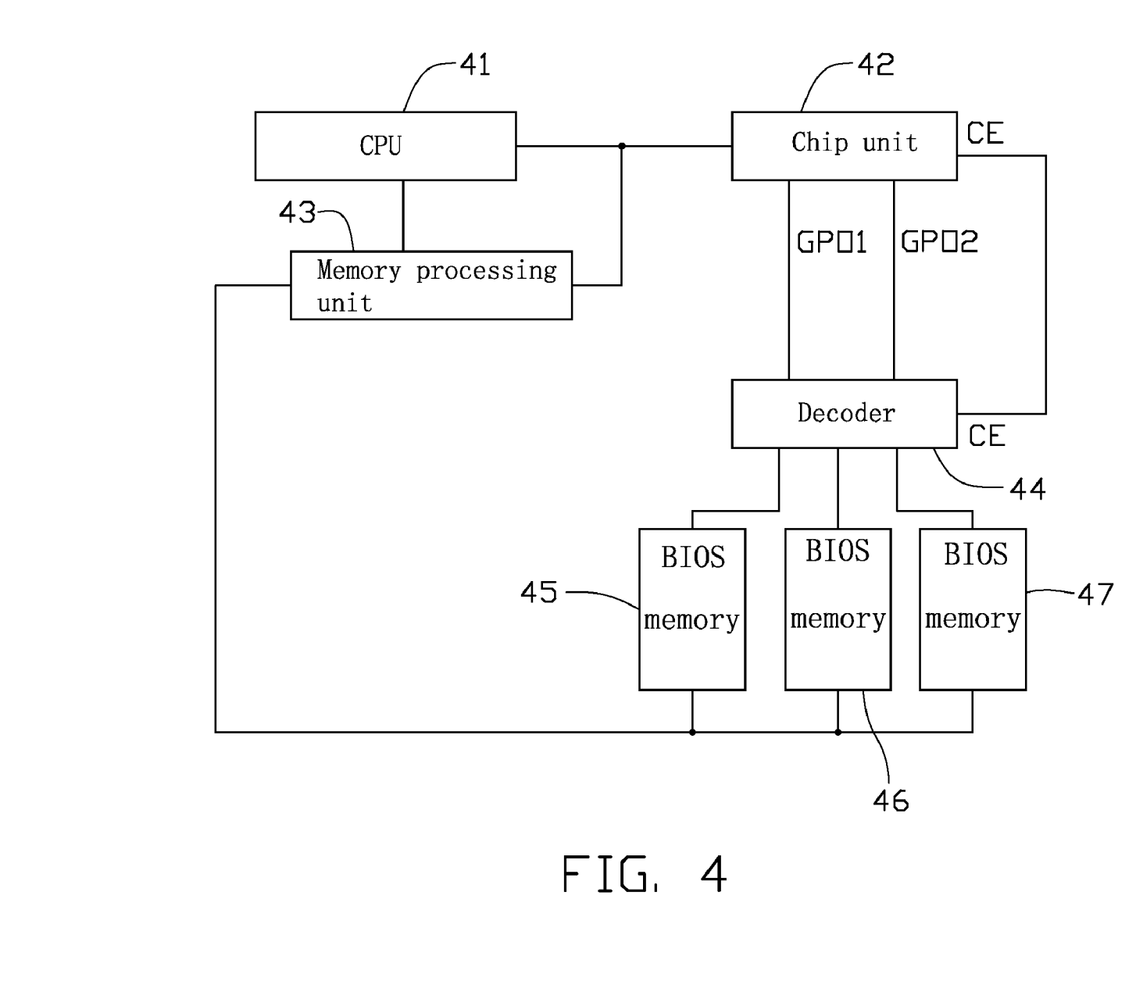
FIG. 4 is a block diagram of the fourth embodiment of a system with at least two BIOS memories in accordance with the present invention.

Referring to FIG. 4, a system with at least two BIOS memories in accordance with the fourth embodiment of the present invention includes a CPU 41, a chip unit 42, a memory processing unit 43, a control such as a decoder 44, three BIOS memories 45, 46, and 47. The CPU 41 and the memory processing unit 43 are similar to the elements of the first embodiment.

The chip unit 42 includes a control pin CE, two chip output pins GPO1, and GPO2. The decoder 44 includes a decoder enable pin CE, two decoder input pins, three decoder output pins, and a decode rule. The enable pin CE of the control unit 42 is connected to the decoder enable pin CE. The two chip output pins GPO1 and GPO2 are respectively connected to the two decoder input pins. The three decoder output pins are respectively connected to the BIOS memories 45, 46, and 47.

The decoder 44 determines the voltage of the three decoder output pins thereof according to the voltages of the two chip output pins GPO1 and GPO2. For example, when the two chip output pins GPO1 and GPO2 output low level voltages, one of the decoder output pins which is connected to the BIOS memory 45 outputs a high level voltage, therefore, the computer system boots with the BIOS memory 45.

In the third and fourth embodiment, users can make the status of the chip output pins via hot keys which are defined in advance.

Figure 5:
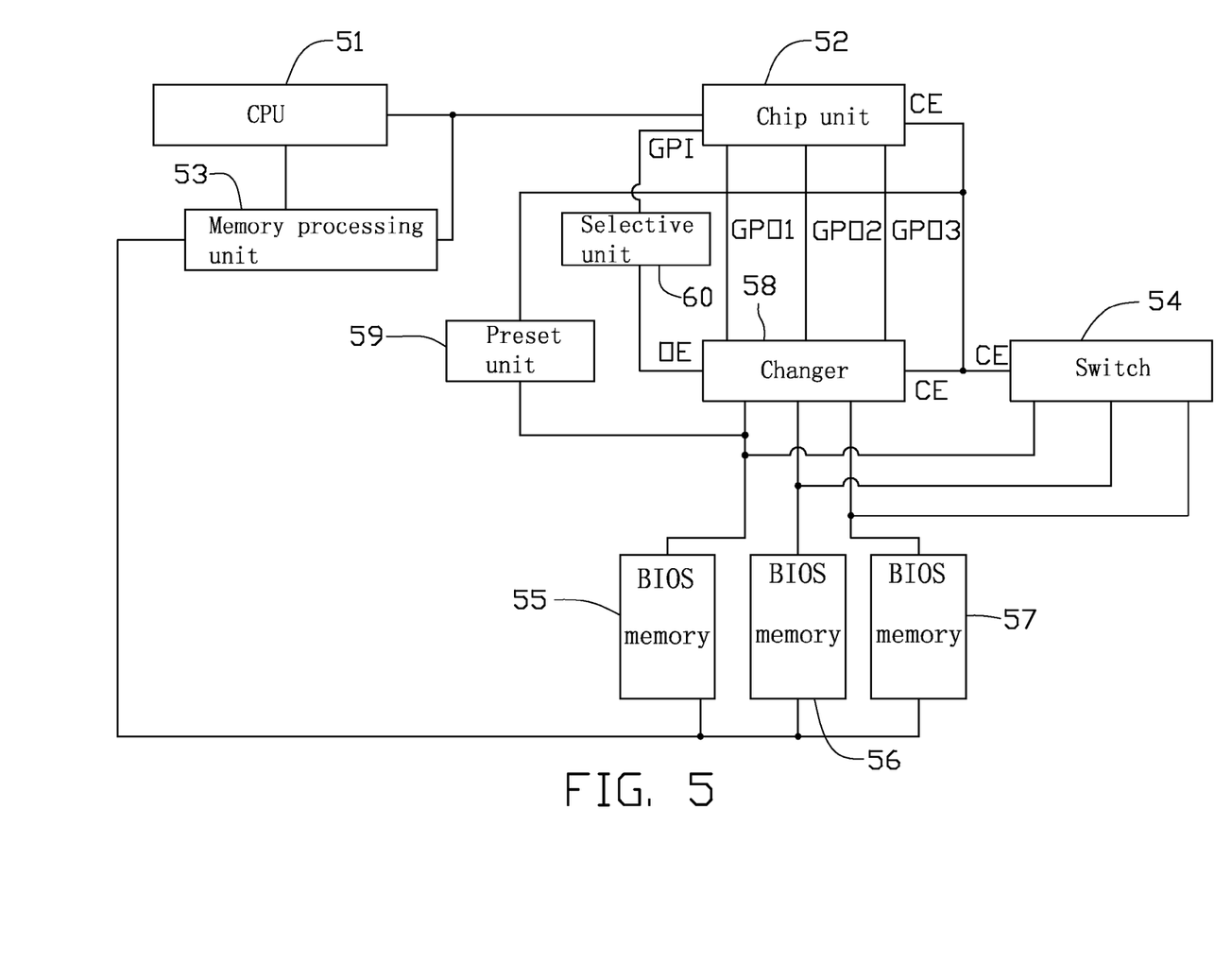
FIG. 5 is a block diagram of the fifth embodiment of a system with at least two BIOS memories in accordance with the present invention.

Referring to FIG. 5, a system with at least two BIOS memories in accordance with the fifth embodiment of the present invention includes a CPU 51, a chip unit 52, a memory processing unit 53, a control unit, three BIOS memories 55, 56, 57, a preset unit 59, and a selective unit 60. The control unit includes a switch 54 and a changer 58. The center processing unit 51, the memory processing unit 53, and the preset unit 59 are similar to the elements of the third embodiment.

The chip unit 52 includes a control pin CE, three chip output pins GPO1, GPO2, GPO3, and a chip input pin GPI. The switch 54 includes a switch enable pin CE, three switch output pins, and three switch throws. Each of the BIOS memories 55, 56, and 57 includes a set-up program. The changer 58 includes two changer enable pins CE, OE, three changer input pins, and three changer output pins.

The control pin CE of the chip unit 52 is connected to the switch enable pin CE, the changer enable pin CE, and a preset unit input pin. The three chip output pins GPO1, GPO2, and GPO3 are respectively connected to the three changer input pins. The three changer output pins are respectively connected to the three switch output pins, and the BIOS memories 55, 56, and 57. The chip input pin GPI is connected to an end of the selective unit 60. The other end of the selective unit 60 is connected to the other changer enable pin CE.

The selective unit 60 is configured to set the status of the switch 54 and the changer 58. The selective unit 60 is a striking gear. The selective unit 60 includes two selective unit throws. When the selective unit 60 turns to a first selective unit throw, it outputs a high level voltage. The switch 54 starts to work, and the working process is similar to the first embodiment. When the selective unit 60 turns to a second selective unit throw, it outputs a low level voltage. The changer 58 starts to work. And the working process is similar to the third embodiment.

Figure 6:
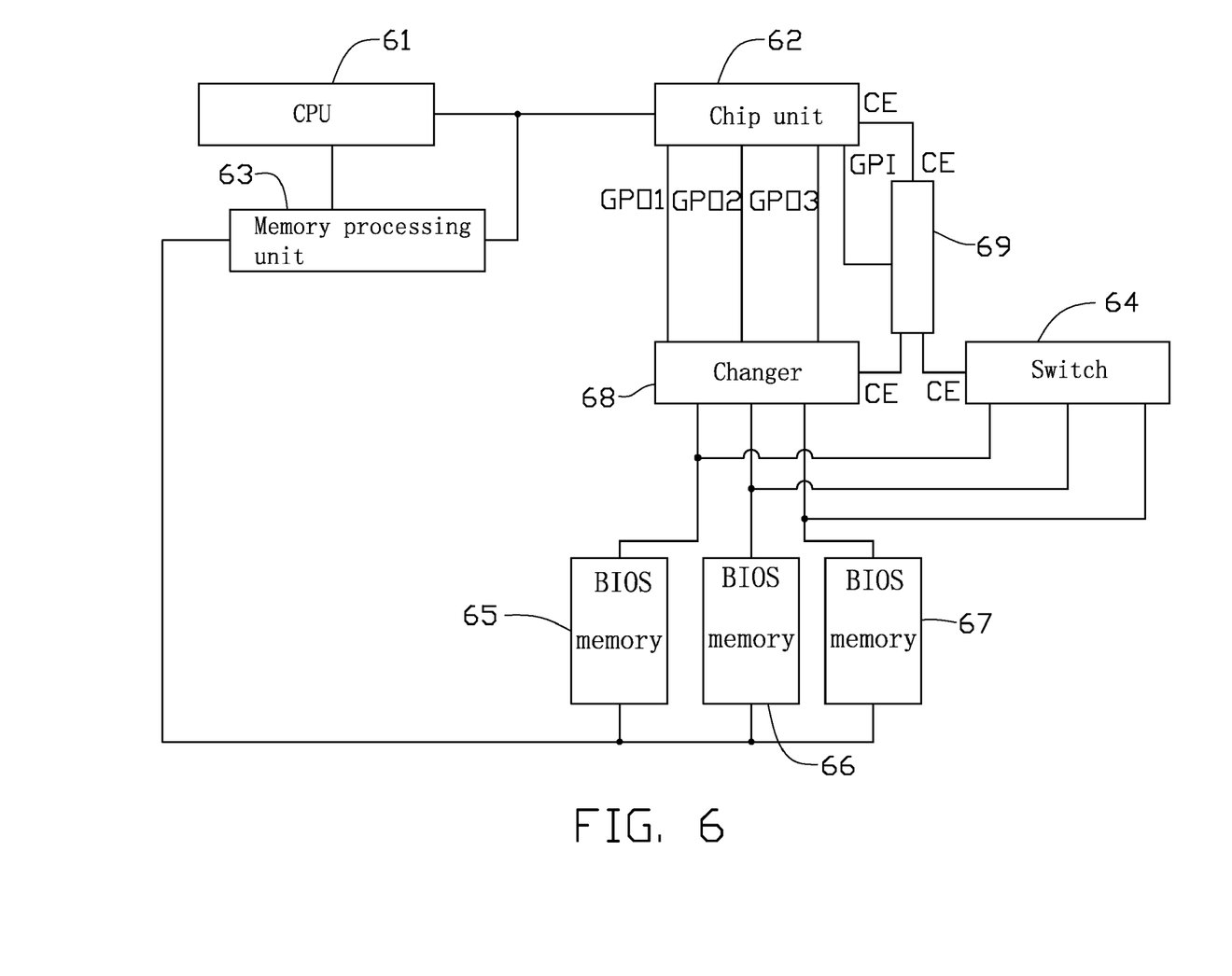
FIG. 6 is a block diagram of the sixth embodiment of a system with at least two BIOS memories in accordance with the present invention.

Referring to FIG. 6, a system with at least two BIOS memories in accordance with the sixth embodiment of the present invention includes a CPU 61, a chip unit 62, a memory processing unit 63, a control unit, three BIOS memories 65, 66, 67, and a selective unit 69. The control unit includes a switch 64 and a changer 68. The CPU 61, the switch 64, and the changer 68 are similar to the elements of the fifth embodiment.

The chip unit 62 includes a control pin CE, three chip output pins GPO1, GPO2, GPO3, and a chip input pin GPI. The selective unit 69 includes a selective unit enable pin CE, two selective unit put pins, and a selective unit input pin. The control pin CE of the chip unit 62 is connected to the selective unit enable pin CE. The chip input pin GPI is connected to the selective unit input pin. Three chip output pins GPO1, GPO2, and GPO3 are respectively connected to three changer input pins. The two selective unit output pins are respectively connected to the switch enable pins CE and the changer enable pins CE.

The selective unit 69 determines the status of the switch 64 and the changer 68 according to the voltages of the two output pins of the control unit 69. After users start the switch 64 or the changer 68, the process is similar to the fifth embodiment.

Figure 7:
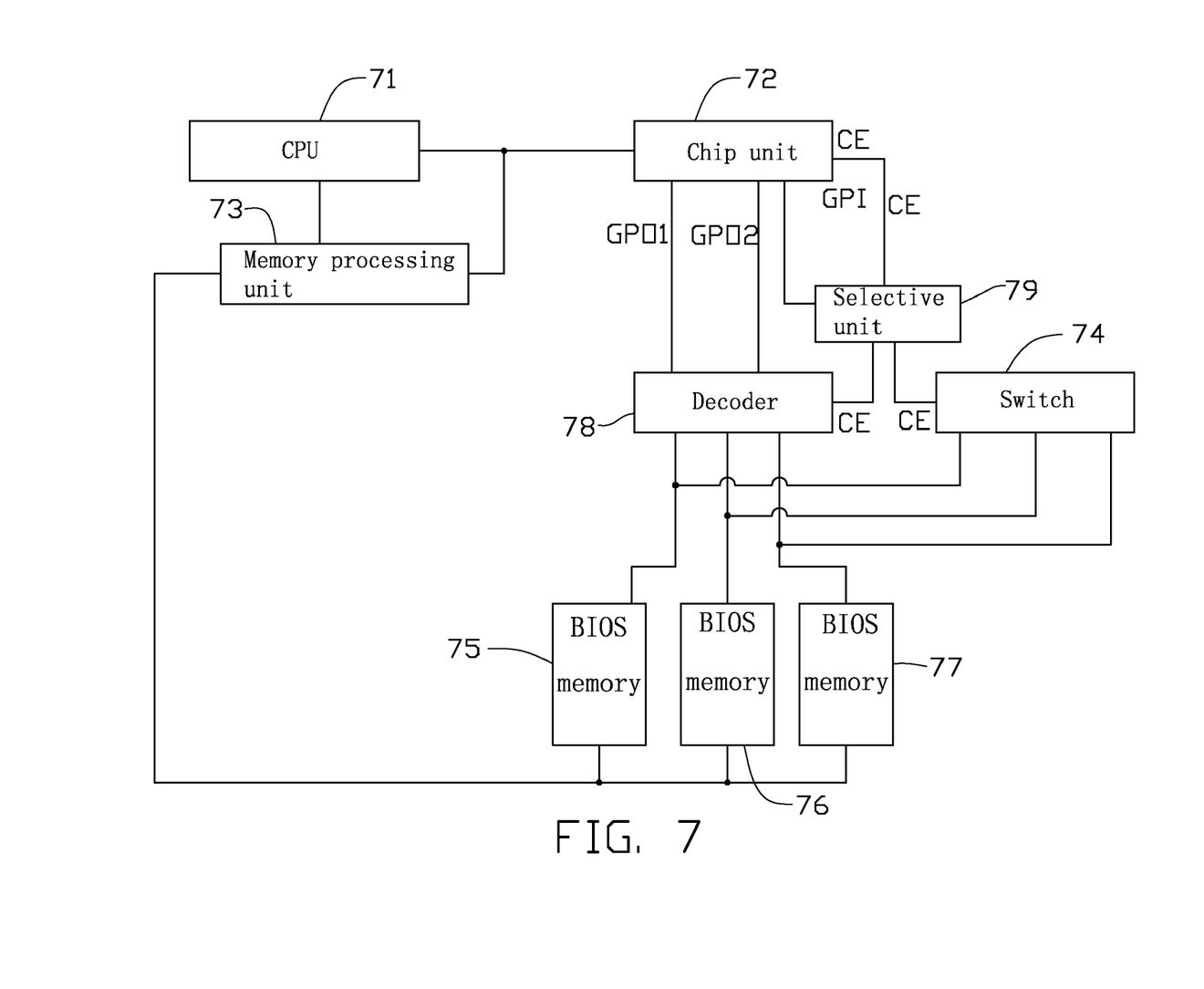
FIG. 7 is a block diagram of the seventh embodiment of a system with at least two BIOS memories in accordance with the present invention.

Referring to FIG. 7, a system with at least two BIOS memories in accordance with the seventh embodiment of the present invention includes a CPU 71, a chip unit 72, a memory processing unit 73, a control unit, three BIOS memories 75, 76, 77, and a selective unit 79. The control unit includes a switch 74 and a decoder 78. The CPU 71, the memory processing unit 73, and the selective unit 79 are similar to the elements of the sixth embodiment.

The chip unit 72 includes a control pin CE, two chip output pins GPO1, GPO2, and a chip input pin GPI. The switch 74 includes a switch enable pin CE and three chip output pins. The decoder 78 includes a decoder enable pin CE, two decoder input pins, and three decoder output pins. The two chip output pins GPO1 and GPO2 are respectively connected to the two decoder input pins. The chip input pin GPI is connected to the selective unit input pin. The two selective unit output pins are respectively connected to the switch enable pin CE and the decoder enable pin CE.

Users can determine the status of the switch 74 and the decoder 78 according to the selective unit 79. After users start the switch 74, the process is similar to the firth embodiment. And after users start the decoder 78, the process is similar to the fourth embodiment. In this embodiment, the decoder 78 is similar to the fourth embodiment.

In the sixth and the seventh embodiment, users can determine the voltages of the control pin of the chip control unit via a defined hot key in advance.

In the firth to seventh embodiment, programs in the BIOS memories are similar or different. And the numbers of the BIOS memories can be changed according to need.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternately embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A system with at least two basic input-output system (BIOS) memories comprising:
    a chip unit comprising a control pin and M chip output pins;
    a control unit comprising a changer, wherein the changer comprises a changer enable pin, M changer input pins, and N changer output pins, the changer enable pin of the control unit is connected to the control pin of the chip unit, the M changer input pins are respectively connected to the M chip output pins;
    a preset unit comprising a preset unit input pin and a preset unit output pin, wherein the preset unit out pin is connected to the control pin of the chip unit; and
    N BIOS memories respectively connected to the N changer output pins, wherein the chip unit is configured to start the changer, the changer is configured to start one of the N BIOS memories according to voltages of the N output pins of the control unit, the preset unit output pin is connected to one of the BIOS memories, the preset unit is configured to start the BIOS memory connected to the preset unit output pin, wherein each of N and M is an integer greater than one, the changer is configured to start one of the N BIOS memories according to voltages of the M chip output pins.

2. The system with at least two BIOS memories as claimed in claim 1 further comprising predetermined M defined hot keys, each of the M defined hot keys denotes voltage of one of the M chip output pins.

3. The system with at least two BIOS memories as claimed in claim 1, further comprising a selective unit, the chip unit further comprising a chip input pin, the control unit further comprising a switch, wherein the switch comprises a switch enable pin, N switch output pins, and N switch throws, the selective unit comprises a selective unit enable pin, two selective unit output pins, and a selective unit input pin, the switch enable pin is connected to one of the selective unit output pins, the N changer output pins and are respectively connected to the N switch output pins, the selective unit input pin of the selective unit is connected to the chip input pin, the other selective unit output pin is connected to the switch enable pin, the selective unit enable pin is connected to the chip control pin, the selective unit is configured to determine the status of the switch and the changer, the N switch throws are configured to selectively connect the switch enable pin and one of the N switch output pins to start the N BIOS memories correspondingly.

4. A system with at least two basic input-output system (BIOS) memories comprising:
    a chip unit comprising a control pin, a chip input pin, and M chip output pins;
    a selective unit comprising a selective unit enable pin connected to the control pin of the chip unit, a selective unit input pin connected to the chip input pin, a first selective unit output pin, and a second selective unit output pin;
    a control unit comprising a changer and a switch, wherein the changer comprises a changer enable pin connected to the first selective unit output pin, M changer input pins connected to the M chip output pins correspondingly, and N changer output pins; the switch comprises a switch enable pin connected to the second selective unit output pin, N switch output pins connected to the N changer output pins correspondingly, and N switch throws; and
    N BIOS memories, each of the N BIOS memories connected to one of the N changer output pins and one of the N switch output pins, wherein the changer is configured to start one of the N BIOS memories according to voltages of the N chip output pins, the chip unit is configured to determine the status of the changer and the switch, the N switch throws are configured to selectively connect the switch enable pin and one of the N switch output pins to start the N BIOS memories correspondingly, wherein N and M are integers greater than one.

5. A system with at least two basic input-output system (BIOS) memories comprising:
    a chip unit comprising a control pin and M chip output pins;
    a control unit comprising a decoder, wherein the decoder comprises a decoder enable pin, M decoder input pins, N decoder output pins, and a decode rule, the M decoder input pins are respectively connected to the M chip output pins, the decoder enable pin is connected to the control pin of the chip unit;
    N BIOS memories respectively connected to the N decoder output pins, the chip unit is configured to start the control unit, the decoder determines voltages of the decoder output pins to start the N BIOS memories via voltages of the M decoder input pins according to the decode rule, wherein each M and N is an integer greater than one; and
    predetermined M defined hot keys, each of the M defined hot keys denotes voltage of one of the M chip output pins.

* * * * *